United States Patent [19]

Smith

[11] Patent Number: 5,086,617

[45] Date of Patent: Feb. 11, 1992

[54] GAS TURBINE ENGINE FUEL CONTROL SYSTEM, AND METERING VALVE

[75] Inventor: Trevor S. Smith, Birmingham, England

[73] Assignee: Lucas Industries Public Limited Company, Birmingham, England

[21] Appl. No.: 491,097

[22] Filed: Mar. 9, 1990

[30] Foreign Application Priority Data

Mar. 16, 1989 [GB] United Kingdom ............... 8906060

[51] Int. Cl.$^5$ ............................................. F02C 9/28
[52] U.S. Cl. ................................................. 60/39.281
[58] Field of Search ..................................... 60/39.281

[56] References Cited

U.S. PATENT DOCUMENTS

| | | | |
|---|---|---|---|
| 4,473,999 | 10/1984 | Smith | 60/39.281 |
| 4,578,945 | 4/1986 | Peck et al. | 60/39.281 |
| 4,608,820 | 9/1986 | White et al. | 60/39.281 |
| 4,760,696 | 8/1988 | Rooks et al. | 60/39.281 |
| 4,817,376 | 4/1989 | Brocard et al. | 60/39.281 |

*Primary Examiner*—Louis J. Casaregola
*Attorney, Agent, or Firm*—Staas & Halsey

[57] ABSTRACT

A fuel control system for a gas turbine engine has a metering valve and a shut-off valve in series, and a spill valve for spilling fuel from upstream of the metering valve in response to an overspeed condition of the engine. The spill valve and shut-off valve are responsive to respective servo pressures, and an electrically operated valve can control both servo pressures in response to a demand to shut down the engine. The electrically operated valve can also control a third servo pressure for setting a minimum flow limiting stop in the metering valve to a lower limiting level during engine starting.

9 Claims, 4 Drawing Sheets

GAS TURBINE ENGINE FUEL CONTROL SYSTEM, AND METERING VALVE

BACKGROUND OF THE INVENTION

In a gas turbine engine fuel system it is required to limit fuel flow in response to excursion of one or more engine operating conditions outside acceptable limiting values. Such flow limitation may be effected by spilling fuel from the inlet of a main metering valve of the system. Where a spill valve is provided for this purpose it will usually be operated only in response to the aforesaid unacceptable limiting values, and such operation may occur only rarely. In the present invention the flow-limiting spill valve is additionally operated in normal use to ensure that fuel at the main metering valve inlet is at a low pressure when the engine is shut down and has a limited rise in pressure when the engine is started.

SUMMARY OF THE INVENTION

According to a first aspect of the invention there is provided a fuel control system for a gas turbine engine comprising a metering valve for regulating fuel flow to the engine, a shut-off valve in series with said metering valve, said shut-off valve being responsive to a first servo pressure, a spill valve for spilling fuel to a low pressure from a location upstream of said metering valve, said spill valve being responsive to the pressure at said upstream location and to a second servo pressure, and a first electrically energisable valve which is operable to control said first and second servo pressures.

Main metering valves for gas turbine engine fuel systems are commonly provided with stops which limit movement of a metering element in directions to increase and decrease fuel flow. The minimum acceptable fuel flow for an aircraft gas turbine engine during flight is higher than that during engine starting. It is an object of a further aspect of the invention to provide a metering valve in which two different minimum fuel flow levels can be selected.

According to another aspect of the invention there is provided a main metering valve for a gas turbine engine, said valve comprising a housing, an inlet, an outlet, a control element axially movable in the housing, said control element having a portion engageable with a stop which defines a minimum flow position of said element, said stop being carried by a member which is axially movable in said housing between abutments therein in response to variations in the level of a servo pressure signal, and a pilot valve for varying said pressure signal level.

BRIEF DESCRIPTION OF THE DRAWINGS

An embodiment of the invention will now be described by way of example only and with reference to the accompanying drawings in which.

DETAILED DESCRIPTION OF THE PREFERRED EMBODIMENTS

Figure 1:
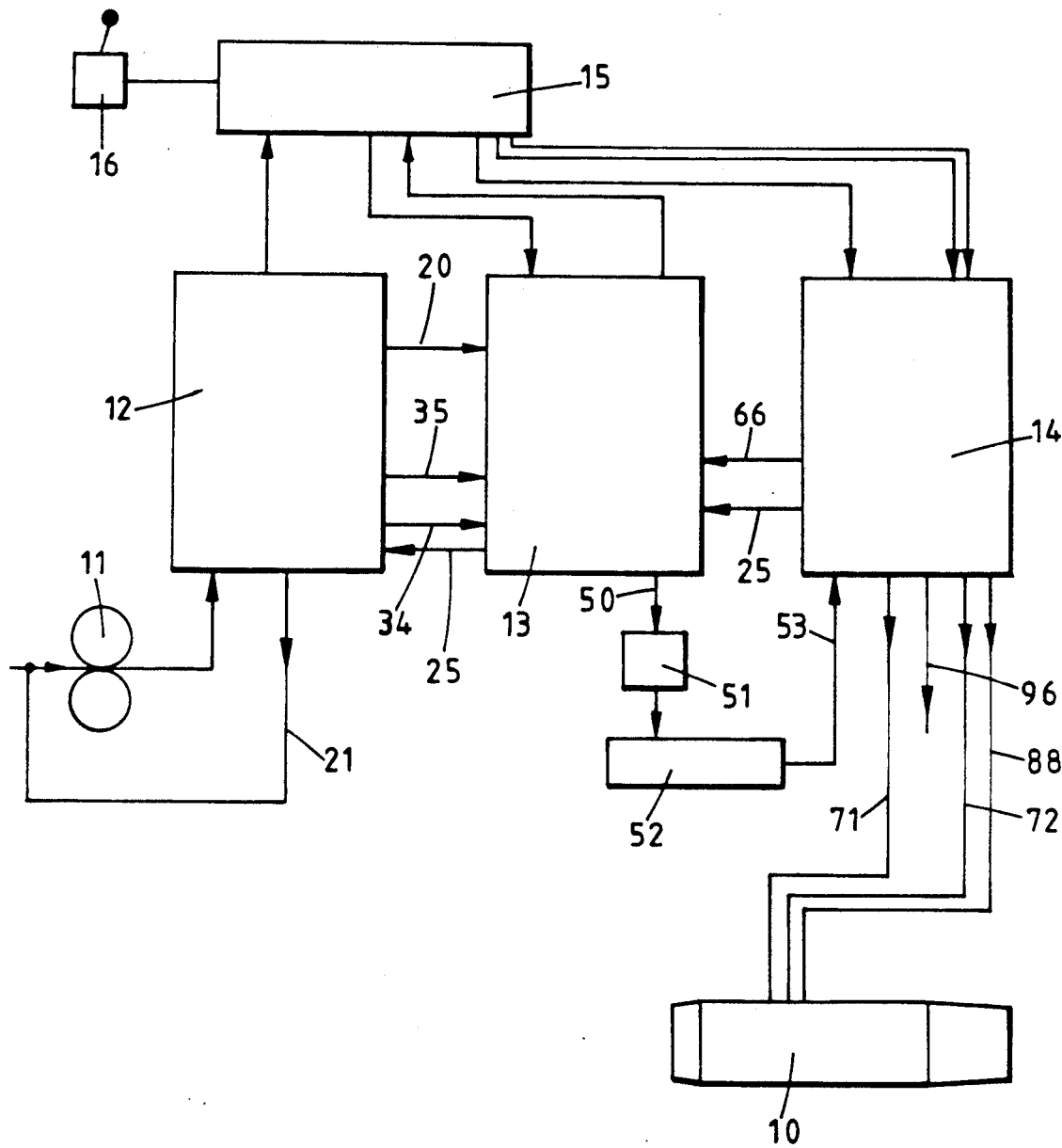
FIG. 1 is a block diagram of a fuel control system.

As shown in FIG. 1 fuel is supplied to an engine 10 from a pump 11 by way of a spill valve arrangement 12, a main metering valve arrangement 13 and a combined pressure raising and shut-off valve arrangement 14. The valve arrangements 13, 14 each include torque motors which are powered from an electric control circuit 15. The circuit 15 is responsive to a throttle control 16, to sensed operating conditions of the engine 10 and to signals from valve position transducers in the arrangements 12, 13.

Figure 2:
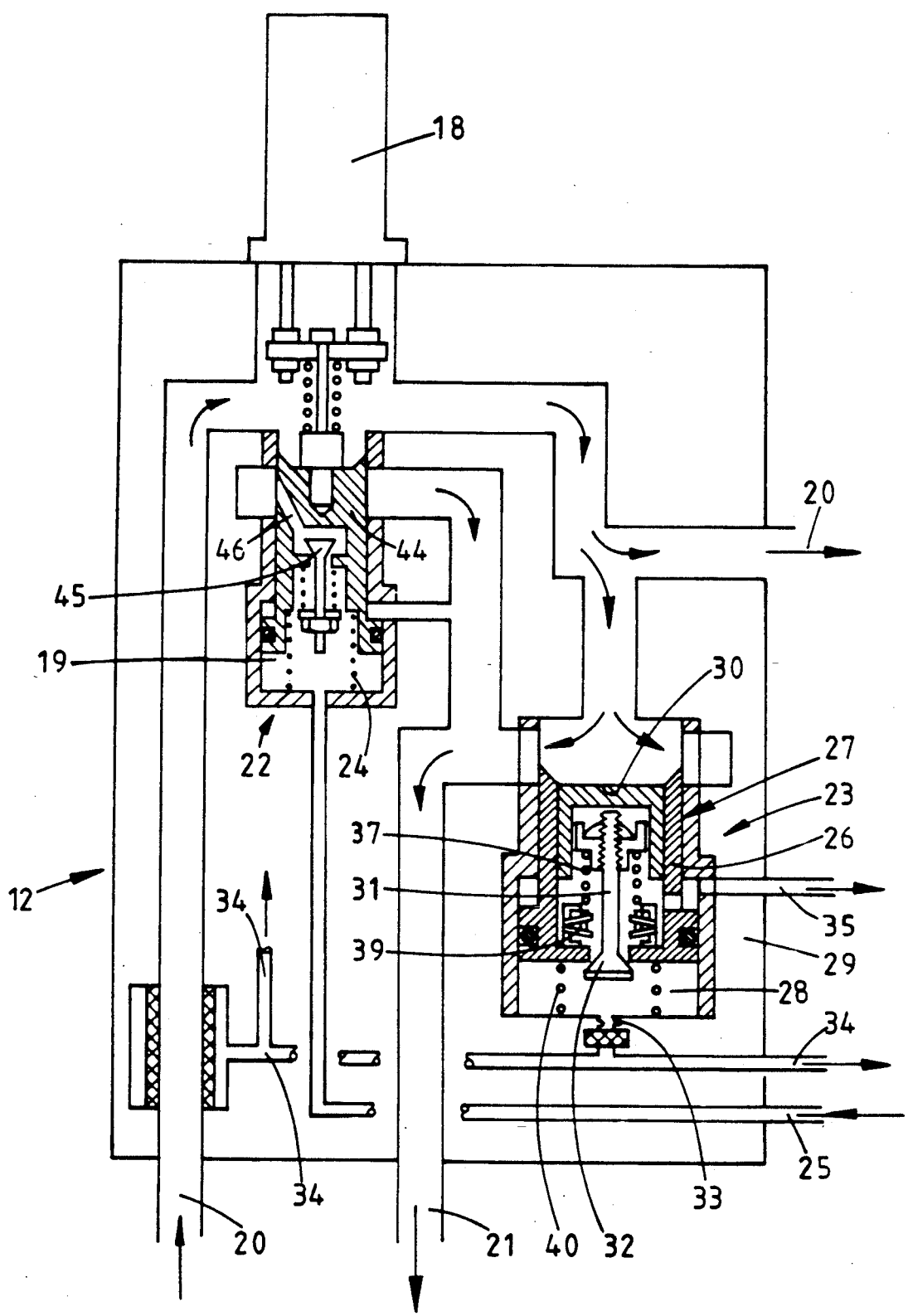
FIG. 2 is a diagram of a spill valve arrangement forming part of FIG. 1.

As shown in FIG. 2 a passage 20 from the outlet of the pump 11 can communicate with a low pressure return line 21 through either of two spill valves 22, 23. The valve 22 has a control element 44 which is urged shut against the pressure in passage 20 by a biasing spring 24 and a servo pressure in a chamber 19, supplied through a line 25.

The element 44 carries a spring biased pressure relief valve 45 which lifts at a predetermined pressure to connect the chamber 19 to the return line 21, by way of a passage 46 in the element 44.

Figure 4:
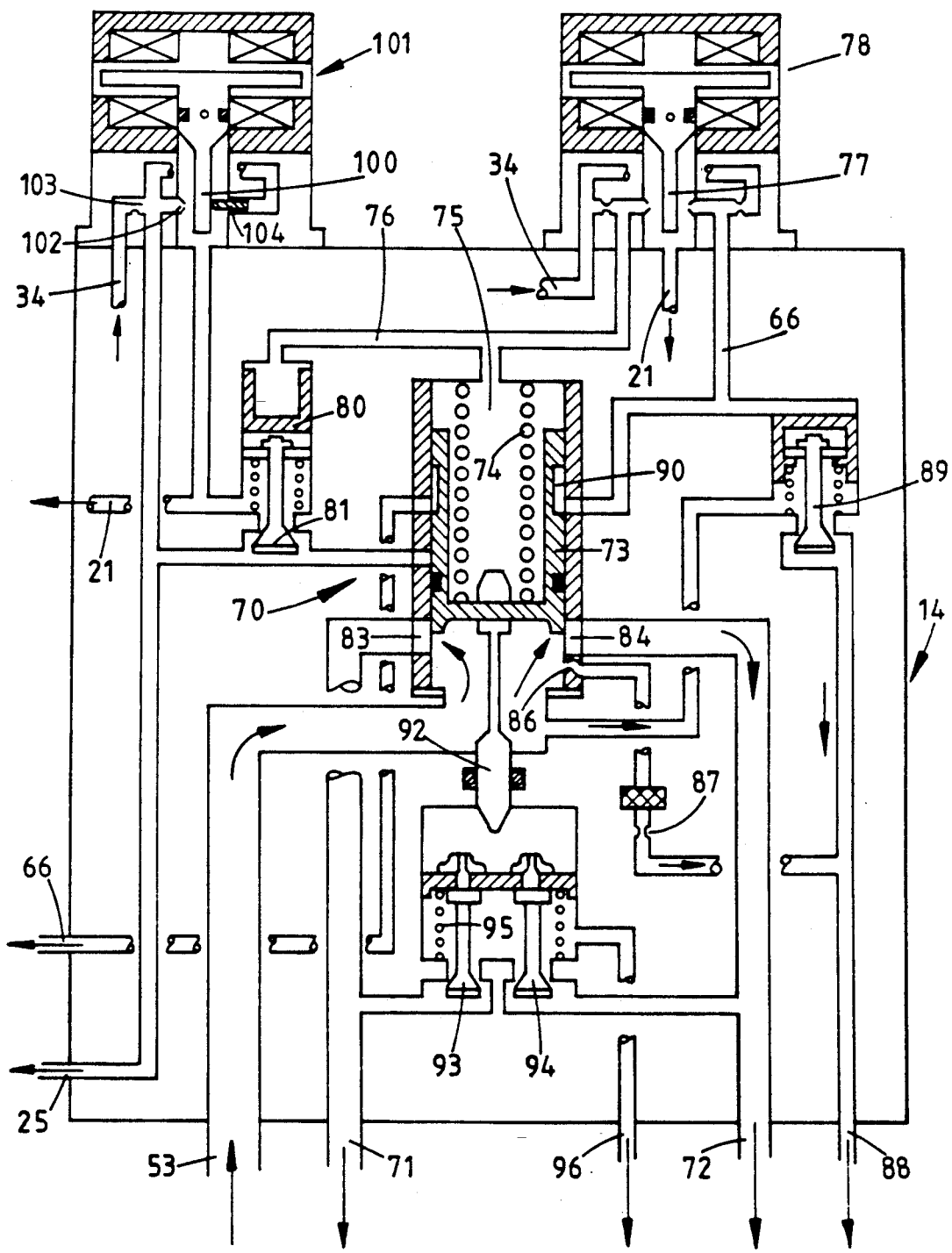
FIG. 4 shows a pressure raising and shut-off valve arrangement forming part of FIG. 1.

The pressure in line 25 is responsive to operation of a valve 100 (FIG. 4). The valve 100 is spring-biased clockwise to maintain the pressure in line 25 high when the system is operating, and is operable anticlockwise by energisation of a torque motor 101. The motor 101 is operated by the circuit 15 in response to excursion of one or more operating conditions of the engine 10, as for example engine speed, beyond an acceptable value. In these circumstances anticlockwise movement of the valve 100 reduces pressure in the line 25 and allows the spill valve 22 to open. The valve 100 controls flow through a nozzle 102 in series with a restrictor 103 between the high pressure line 34 and the return line 21. The pressure in line 25 is applied to a piston 104 which engages the valve 100, to assist the spring bias thereon. With the valve 100 de-energised the pressure in line 25 is thus that in the passage 20 and line 34. The pressure relief valve 45 is thus effective to relieve overpressure at the outlet of the pump 11.

The operating position of the valve 22 is signalled to the circuit 15, (FIG. 1) by a transducer 18. The valve 23 has a control element 26 which is slidable in a bore 27 to control flow between the passage 20 and the line 21. The control element 26 is responsive to a servo pressure in a chamber 28 which is defined between a housing 29 and one end of the control element 26. A piston 30 is slidable within the control element 26 and includes a stem 31 which extends through the end of the control element 26 and defines, in conjunction with that end, a valve 32 for regulating servo pressure in the chamber 28. The valve 32 is in series with a flow restrictor 33 between a high pressure line 34 and a passage 35 which communicates with the downstream side of the metering valve arrangement 13. The piston 30 is thus responsive to a difference between the pressures upstream and downstream of the metering valve arrangement 13 and is biased against movement in response to this pressure difference by a spring 37 which is supported on a stack 39 of bi-metal discs which are responsive to fuel temperature. The bias applied by the spring 37, for a given position of the piston 30 relative to the control element 26, is thus adjusted in accordance with fuel temperature. A further spring 40 acts to shut the valve 23 in the absence of a pressure in the passage 20.

An increase in the pressure difference across the metering valve arrangement 13 causes the piston 30 to move downwardly, opening the valve 32 and reducing the servo pressure in the chamber 28. The control element 26 then moves downwardly to increase spill flow until the aforesaid pressure difference returns to its original value.

Figure 3:
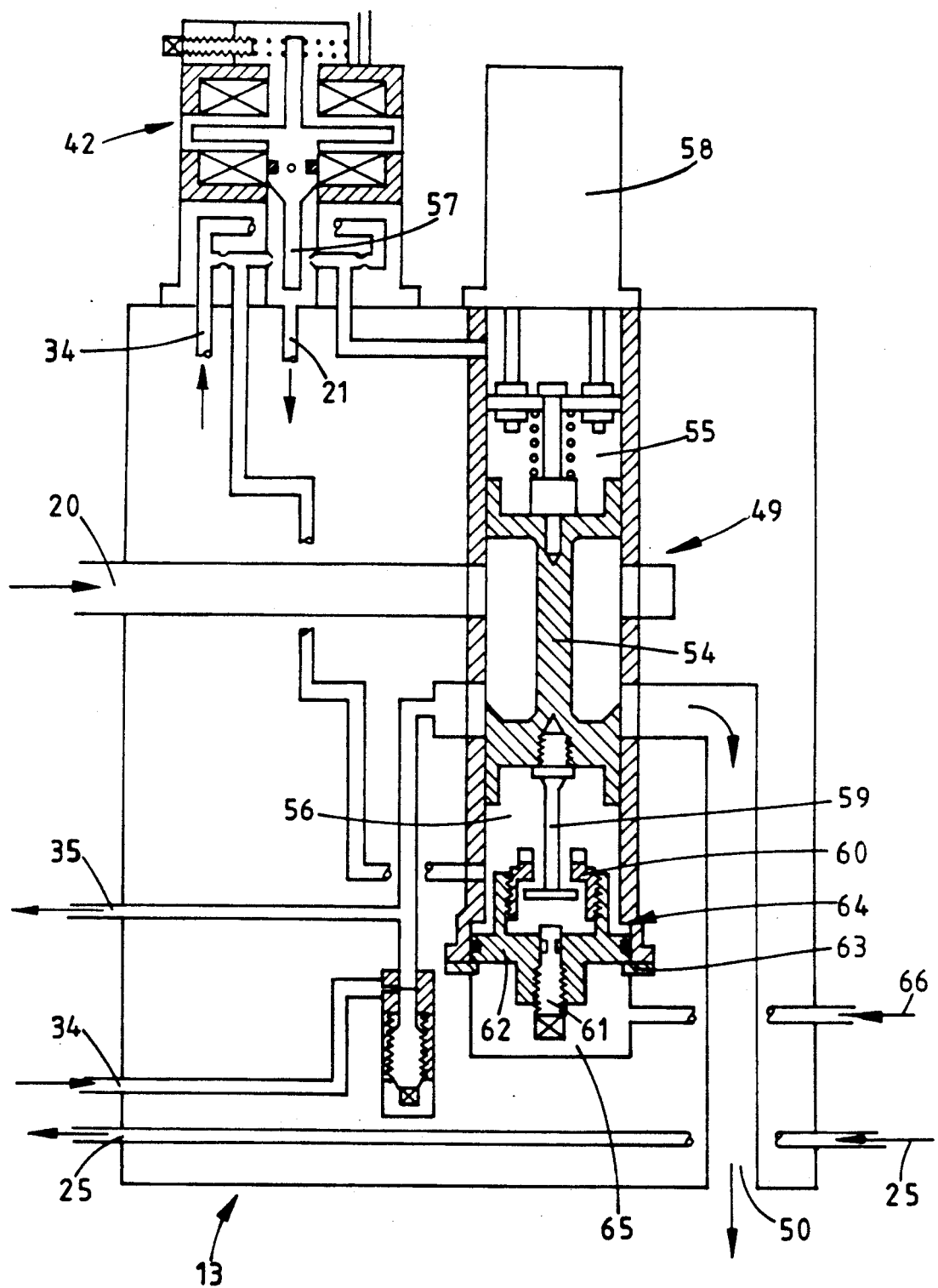
FIG. 3 shows a main metering valve arrangement forming part of FIG. 1.

The arrangement shown in FIG. 3 includes a metering valve 49 having an inlet communicating with the passage 20 and an outlet communicating with the valve arrangement 14 by way of a passage 50, a flow meter 51, an oil cooler 52 and a further passage 53 (FIG. 1). The valve 49 has a control element 54 responsive to a difference between pressures in chambers 55, 56, these pressures being derived by a valve 57 from the high and return pressures in lines 34 and 21 respectively. The valve 57 has a small bias away from a central position, in a clockwise direction, and is operable in either direction away from its biassed position by a torque motor 42. It will be seen that anticlockwise movement of the valve 57 is accompanied by an increase in pressure in the chamber 55 and by a decrease in pressure in the chamber 56. In the event of loss of current to the torque meter 42, the closewise bias on the valve 57 produces a small pressure difference across the metering valve control element 54, moving the latter slowly to a minimum flow position defined by the stop 60.

The position of the element 54 is sensed by a transducer 58 which supplies a corresponding signal to the circuit 15 (FIG. 1). The element 54 includes a flanged stem 59 which can engage stops 60, 61 to provide minimum and maximum fuel flow positions respectively of the element 54. The stops 60, 61 are adjustably and threadedly mounted on a member 62 which is axially slidable between abutments 63, 64 in a housing of the valve 49, to provide upper and lower levels respectively of minimum fuel flow. The member 62 is urged to its higher minimum flow position by the pressure in the chamber 56 and to its lower minimum flow position by the pressure in a chamber 65, this latter pressure being derived in a manner to be described and applied through a line 66 from the valve arrangement 14.

As shown in FIG. 4 the valve arrangement 14 includes a pressure raising valve 70 which receives fuel from the passage 53 and discharges it through two separate delivery passages 71, 72 to the engine 10. The valve 70 has a control element 73 which is biased towards a shut position by a spring 74 and is axially movable against that bias by the pressure in the passage 53. The control element 73 is also urged towards its shut position by a servo pressure in a chamber 75, this pressure being intermediate those in the high pressure line 34 and the low pressure return line 21 and is applied to a line 76 by a valve 77 which is operated by a torque motor 78. The motor 78 has two coils which are separately energisable to urge the valve 77 in respective opposite directions from a central position. With both coils of the motor 78 de-energised the pressure in chamber 75 is at or near that in the low pressure line 21. In this condition the valve element 73 is acted on by the spring 74 alone, and when flow through the valve 70 is relatively low the element 73 moves towards its shut position, throttling the flow and raising the pressure in the passage 53, thereby providing the necessary operating servo pressures in the system. At low flows through the valve 70 the pressure difference across its outlet ports 83, 84 will be substantially higher than the pressure difference across the burners in the engine 10. Inequalities between the burner pressure differences or between the gravity heads at the burners, will have a relatively small effect, and the fuel flow through the passages 71, 72 will be substantially equal. The pressure in line 76 is also applied to a plunger 80 and can open a valve 81 between the lines 21, 25, the valve 81 normally being spring-biased shut.

The inlet passage 53 can also communicate by way of an outlet 86 and a flow restrictor 87 with a line 88 to the igniter jets of the engine 10. In the shut condition of the valve 70 the outlet 86 is also shut. The inlet passage 53 can also communicate with the line 88 by way of a valve 89 which is spring biased shut, but during start operation is lifted against its spring by the pressure in passage 66. The valve 89 is therefore shut during normal operation and when the engine is shut down.

In the shut down condition of the engine 10 the valve 70 (FIG. 4) is held shut by the spring 74, and lines 25 and 66 are interconnected by the groove 90, so that the pressure in the chamber 19 (FIG. 2) has the same low value as that in line 66. The spring bias of the valve 100 maintains the latter clockwise, thereby isolating the line 25 from the low pressure return line 21.

During engine start up and prior to ignition, the pressure in passage 20 and line 34 rises sufficiently to partly open the valve 22, returning the output from the pump 11 to the line 21, thereby preventing the pressure in line 20 from becoming high enough to open the valve 70. When engine light-up is required the valve 77 (FIG. 4) is energised anti-clockwise and the pressure in line 66 therefore increases to that in line 34. While the valve 70 remains shut the increased pressure in line 66 is applied through the groove 90 to line 25 and assists that applied through valve 100 to shut the valve 22. The increasing pressure in line 66 also urges the member 62 (FIG. 3) towards a position corresponding to a lower level of minimum fuel flow, and opens the valve 89 (FIG. 4), allowing fuel to pass from the passage 53 to the engine igniter jets through the line 88.

Flow through the metering valve 49 in excess of that required by the ignition jets increases the pressure in the passage 53 until the valve 70 opens against its spring. Fuel then flows to the engine main burners through the passages 71, 72. When the engine has reached a predetermined speed, the torque motor 78 is deenergised and the pressure in line 66 falls towards the return pressure in line 21. The valve 89 shuts, but cooling flow to the engine igniter jets continues through the port 86 and restrictor 87. At this engine speed and fuel flow the valve 70 will have opened sufficiently to prevent the lines 25, 66 being interconnected by the groove 90. High pressure in the line 25 is maintained by the valve 100, so that the increase in system pressure maintains the valve 22 shut. De-energisation of the valve 77 reduces the pressure in chamber 65 (FIG. 3) and the member 62 moves to its higher minimum fuel flow setting.

In response to a requirement to shut down the engine 10 the valve 77 is energised clockwise. The increased pressure in line 76 shuts the valve 70 and opens the valve 81. The consequent reduction in pressure in line 25 allows the spill valve 22 to open. The pressures in passage 20 and in the line 34 fall towards that in the line 21. The spill valve 23 and the valve 70 are maintained shut by their biasing springs. In the shut position of the valve 70 the line 25 communicates through a groove 90 in the element 73 with the line 66 which also communicates with one port of the valve 77. With the valve 77 either energised clockwise or de-energised in its central position the pressure in passage 66 is low, whereby the pressure in line 25 and chamber 19 of the valve 22 (FIG. 2) is maintained low and the member 62 (FIG. 3) is maintained in a position corresponding to a higher level of minimum fuel flow.

If the engine 10 is shut down during flight it may be rotated by the air flow through it. The pump 11 which is driven by a shaft of the engine 10 will then continue to deliver fuel. However, since the valve 77 (FIG. 4) will have been energised clockwise the valve 70 will be shut, and the line 25 is connected to the return line 21 through the groove 90 in the element 74, and through the valve 77. The low pressure in line 25 permits the spill valve 22 to open and limit the system pressure to avoid opening the valve 70. When valve 22 has opened and valve 70 has closed, valve 77 may be de-energised.

In the shut position of the valve 70 a stem 92 on the element 73 moves two coupled valves 93, 94 against a biasing spring 95 to connect the passages 71, 72 to a dump outlet 96, allowing reverse purge of the main burner by air from the engine compressor as the engine runs down.

I claim:

1. A fuel control system for a gas turbine engine, comprising:
    a metering valve for regulating fuel flow to the engine;
    a shut-off valve in series with said metering valve;
    means for actuating said shut-off valve in response to a first servo pressure;
    a spill valve for spilling fuel to a low pressure from a location upstream of said metering valve;
    means for actuating said spill valve in response to a second servo pressure; and
    a first electrically energizable valve which is operable to control said first and second servo pressures, independently of control of said metering valve.

2. A system as claimed in claim 1, which includes a further valve and means for actuating said further valve in response to said first servo pressure, said further valve controlling said second servo pressure.

3. A system as claimed in claim 1, which includes a further valve for connecting the downstream side of said metering valves to igniter jets in said engine, and means for actuating said further valve in response to a third servo pressure signal, said third servo pressure signal being controlled by said first electrically energizable valve.

4. A system as claimed in claim 1 which includes a second electrically energisable valve which is operable to control said second servo pressure.

5. A system as claimed in claim 1 in which said shut-off valve includes means, operable when said shut-off valve is in its shut position, to connect said second servo pressure to a low pressure.

6. A system as claimed in claim 5 in which said metering valve includes a control element having a portion engageable with a stop which defines a minimum fuel flow position, said stop being carried by a member which is axially movable between abutments in response to variations in a third servo pressure signal.

7. A system as claimed in claim 1 in which said spill valve includes a relief valve responsive to the excursion of said second servo pressure above a predetermined level to connect said second servo pressure to a low pressure line.

8. A system as claimed in claim 2 which includes a second electrically energisable valve which is operable to control said second servo pressure.

9. A fuel control system for a gas turbine engine, comprising:
    metering valve means for regulating fuel flow to the engine;
    shut-off valve means connected in series with said metering valve for shutting off fuel supply to the engine in response to a first servo pressure,
    spill valve means for spilling fuel to a low pressure from a location upstream of said metering valve in response to the pressure at said upstream location and to a second servo pressure, and
    a first electrically energizable valve which is operable to control said first and second servo pressures.

* * * * *